United States Patent
Fritz

(10) Patent No.: US 10,048,428 B2
(45) Date of Patent: Aug. 14, 2018

(54) DISPLAY DEVICE, REAR VIEW DEVICE AND MOTOR VEHICLE

(71) Applicant: SMR Patents S.à.r.l., Luxembourg (LU)

(72) Inventor: Daniel Fritz, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 15/310,485

(22) PCT Filed: May 7, 2015

(86) PCT No.: PCT/IB2015/053327
§ 371 (c)(1),
(2) Date: Nov. 11, 2016

(87) PCT Pub. No.: WO2015/173695
PCT Pub. Date: Nov. 19, 2015

(65) Prior Publication Data
US 2017/0090100 A1    Mar. 30, 2017

(30) Foreign Application Priority Data

Dec. 5, 2014  (EP) .................................... 14167977

(51) Int. Cl.
*F21V 8/00*       (2006.01)
*B60R 1/02*       (2006.01)
(Continued)

(52) U.S. Cl.
CPC .............. *G02B 6/0051* (2013.01); *B60R 1/02* (2013.01); *B60R 1/081* (2013.01); *B60R 1/12* (2013.01);
(Continued)

(58) Field of Classification Search
CPC .. G02B 6/0051; G02B 6/0038; G02B 6/0058; B60R 1/02; B60R 1/081; B60R 1/12; B60R 2001/1215
See application file for complete search history.

(56) References Cited

U.S. PATENT DOCUMENTS 5,963,280 A  * 10/1999 Okuda ................. G01C 21/365
                                                      349/64
2001/0053075 A1 * 12/2001 Parker .................. A61M 21/02
                                                      362/617
(Continued)

FOREIGN PATENT DOCUMENTS

JP   H07 294745 A   11/1995
JP   2006350343 A   12/2006

OTHER PUBLICATIONS

International Search Report for PCT/IB2015/053327.
Written Opinion of the International Searching Authority for PCT/IB2015/053327.

*Primary Examiner* — Mary Ellen Bowman
(74) *Attorney, Agent, or Firm* — Jones Day

(57) ABSTRACT

A display arrangement for a motor vehicle can be disposed in a rear view device such as an interior- or exterior rear view mirror. The display arrangement may include at least one light source and at least one optical unit. The at least one optical unit may include at least one light-conducting body having at least one coupling-in section through which light emitted by at least one light source can be coupled into the light-conducting body and having at least one coupling-out section through which light can be coupled out of the light-conducting body. The at least one optical unit also comprises at least one optical means which at least in some sections is or can be secured to the light conducting body such that it is overlaid on the surface of the at least one coupling-out section of said light-conducting body. The (Continued)

optical means comprises at least one optical element by means of which a beam path of at least the light passing through the optical element can be deflected and/or split into light bundles, in particular scattered. The display arrangement is characterized in that the optical means includes a plurality of optical elements which, when they are at the same distance from the coupling-in section of the light-conducting body, correspond in their refraction- and/or reflection behavior and, in the opposite case, differ. Further provided are a rear view device comprising such a display arrangement, and a motor vehicle comprising such a rear view device.

11 Claims, 2 Drawing Sheets

(51) Int. Cl.
  *B60R 1/08* (2006.01)
  *B60R 1/12* (2006.01)
(52) U.S. Cl.
  CPC ......... *G02B 6/0038* (2013.01); *G02B 6/0058* (2013.01); *B60R 2001/1215* (2013.01)

(56) References Cited

U.S. PATENT DOCUMENTS

| | | |
|---|---|---|
| 2002/0048165 A1 | 4/2002 | Taniguchi et al. |
| 2011/0085350 A1 | 4/2011 | Chang et al. |

* cited by examiner

DISPLAY DEVICE, REAR VIEW DEVICE AND MOTOR VEHICLE

CROSS-REFERENCE TO RELATED APPLICATIONS

This application is a national stage entry of International Patent Application No. PCT/IB2015/053327, filed May 7, 2015, which claims the benefit of European Patent Application No. 14 167 977.9, filed May 12, 2014, the disclosures of each of which is incorporated herein by reference in their entirety.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The following description relates to a display device of a motor vehicle which can be disposed in a rear view device. For example, such as an interior or exterior mirror, having at least one light-conducting body which comprises at least one coupling-in section through which light emitted by at least one light source can be coupled into the light-conducting body, and which comprises at least one coupling-out section through which light can be coupled out of the light-conducting body, and which comprises at least one optical means which at least in some sections is or can be secured to the light-conducting body such that it is overlaid on the surface of the at least one coupling-out section of the light-conducting body, and which comprises at least one optical element by means of which a beam path of at least the light passing through the optical element can be deflected and/or split into light bundles, in particular scattered. In addition, the description relates to a rear view device having a display device of this kind and to a motor vehicle having a rear view device of this kind.

2. Description of Related Art

US 2002/0048165 A1 relates to a liquid crystal display device for a computer or similar. By forming a multiplicity of dots, in each case by means of a small projecting part or a small recess portion, to change light at a pre-determined angle to an incident surface of a light guide plate in the direction of a permeable surface and adjusting an angle of the inclination of a cross section, it is possible to beam an illuminating light with a suitable angular distribution from a light-emitting surface to a display element in order to improve the brightness of the liquid crystal display device.

Light redirecting films, which each have a pattern of individual optical elements of well-defined shape on a light exit surface for refracting the light which enters the entrance surface of the films from behind in a direction perpendicular to the exit surface, are described in US 2001/0053075 A1. The individual optical elements overlap and intersect one another. Also, the orientation, size and/or shape of the optical elements can be made to redirect more of the incident light from the backlight within a desired viewing angle.

A lighting apparatus, which has a light density distribution of the whole light-emitting surface of high uniformity, is disclosed in JP 2006 3507 A. Here, light from a light source falls on a light guide plate of a light incident surface. Within the light guide plate, the incident light spreads in the longitudinal direction while it is repeatedly totally reflected at the top and bottom surfaces of the light guide plate. A multiplicity of diffraction gratings is formed continuously on the top and/or bottom surface of the light guide plate in order to form a hologram pattern. Some of the light which spreads in the light guide plate is therefore diffracted and emitted at the top of the light guide plate. The depth of the diffraction gratings increases from the light incident surface in the longitudinal direction of the light guide plate. Display devices for rear view devices in the form of blind spot displays in exterior mirrors are known. As a result of these, the driver of a motor vehicle is shown in the exterior mirror whether another road user is in the blind spot and is therefore assisted in deciding whether a driving maneuver, such as turning off or overtaking, might currently be risky.

The known display devices comprise at least one light source, the light radiated from which is guided into a light-conducting body and deflected and scattered thereby in such a way that the light can pass to the outside through a mask and be perceived and interpreted by the driver of the motor vehicle in the form of a symbol formed by the mask. With the known display devices, it has been shown to be laborious to be able to guarantee a uniform illumination of the display device by the optical unit, in particular to be able to provide sufficiently high light densities for different driver viewing angles.

SUMMARY

An object of an embodiment of the invention is to provide a display device with which the light density is increased at different viewing angles.

With a display device of the kind mentioned in the introduction, this object is achieved in that the optical means comprises a plurality of optical elements which, when they are at the same distance or at a different distance from the coupling-in section of the light-conducting body, correspond in their refraction and/or reflection behavior and, in the opposite case, differ.

The coupling-out section can be disposed opposite the coupling-in section. When the display device is disposed in a rear view device, the coupling-out section is disposed adjacent to a multi-layer reflection means, such as a mirror surface. In such a case, the light emitted by the light source undergoes a deflection of 90° through the light-conducting body. Between a mirror surface of the reflection means and the light-conducting body is a mask which largely covers the light-conducting body and through the cutouts of which the light can pass to the outside.

As the optical means comprises a plurality of optical elements which, when they are at the same distance or at a different distance from the coupling-in section of the light-conductor, correspond or differ respectively in their refraction and/or reflection behavior, the light at the different points within the light-conducting body is reflected differently, thus resulting in a high light density for the different viewing angles.

Basically, it is conceivable that the multiplicity of optical elements which are at the same distance from the coupling-in section differ in their refraction and/or reflection behavior. However, it proves to be advantageous when a multiplicity of optical elements which are at the same distance from the coupling-in section of the light-conducting body correspond in their refraction and/or reflection behavior.

The at least one optical element can basically have any contour. It proves to be expedient when the at least one optical element has an n-cornered, in particular arrow-shaped, or curved, in particular circular-arc-shaped, cross section and/or a pyramid or dome-shaped or elliptical contour.

When the at least one optical element has an n-cornered cross section, it can be formed in the shape of a prism. When it has a curved, in particular circular-arc-shaped cross section, it can be formed in the manner of a lens.

The cross section of the at least one optical element can increase or decrease with increasing distance from the coupling-in section. A diffraction and reflection behavior of the optical element can be defined by means of the cross section of the optical element. This can be defined thereby in accordance with a desired light density distribution.

It is conceivable that the coupling-out section of the light-conducting body is formed by a flat surface. However, in an embodiment of the optical unit, it proves to be advantageous when the at least one coupling-out section of the light-conducting body comprises a plurality of coupling-out regions, which in each case are disposed offset in steps and/or in a sawtooth matter with respect to one another and on which at least one of the at least one optical elements is disposed. This enables the light density to be additionally adjusted.

In a development of the latter embodiment, it can be provided that a plurality of optical elements which have the same diffraction and/or reflection behavior and/or the same cross section are disposed on each coupling-out region.

In addition, it proves to be advantageous for adjusting the light density when the light conductor has its greatest extension along a main extension direction and that, when they are at the same distance or at a different distance from the coupling-in section of the light-conducting body, the coupling-out regions have the same or a different inclination respectively with regard to the main extension direction.

In addition, an embodiment is provided in which the inclination of the coupling-out regions with respect to the main extension direction increases with increasing distance and/or the cross sections of the plurality of optical elements increase with increasing distance from the coupling-in section.

In order to be able to guarantee a compact design of the display device, it proves to be advantageous when the at least one coupling-in section is disposed running substantially perpendicular to the main extension direction of the light-conducting body.

Further, it can be provided that the light-conducting body and the optical means comprise a common component, in particular injection-molded part, or two separate and/or separable components, in particular that the light-conducting body comprises an injection-molded part and the optical means an injection-molded part, a coating and/or a film.

When the light-conducting body and the optical means comprise a common component, in particular the injection-molded part, it can be produced easily and cost effectively.

When the light-conducting body and the optical means comprise two separate and/or separable components, one and the same light-conducting body can be equipped with different optical means depending on the application. In such a case, the optical unit is designed in a modular fashion.

In addition, it proves to be advantageous when the at least one coupling-out section of the light-conducting body has a plurality of coupling-out regions which are disposed offset in a sawtooth matter with respect to one another, wherein a first coupling-out region next to the coupling-in section has a first angle of inclination with respect to the main extension direction, wherein a second coupling-out region adjacent to the first coupling-out region on the side thereof which faces away from the coupling-in region has a second angle of inclination with respect to the main extension direction, wherein a third coupling-out region adjacent to the second coupling-out region on the side thereof which faces away from the coupling-in region has a third angle of inclination with respect to the main extension direction and/or wherein an (n+1)th coupling-out region adjacent to an (n)th coupling-out region on the side thereof which faces away from the coupling-in region has an (n+1)th angle of inclination with respect to the main extension direction.

Finally, in an embodiment of the display device, it is provided that the optical element has a circular-arc-shaped cross section, in particular a dome, wherein at least one, in particular a plurality of, first optical element(s) disposed on the first coupling-out region has a first radius, wherein at least one, in particular a plurality of, second optical element(s) disposed on the second coupling-out region has a second radius, wherein at least one, in particular a plurality of, third optical element(s) disposed on the third coupling-out region has a third radius and/or wherein at least one, in particular a plurality of, (n)th optical element(s) disposed on an (n)th coupling-out region has an (n)th radius.

In addition, the object is achieved by a rear view device in the form of an interior or exterior mirror having at least one display device according to the invention.

Finally, the object is achieved by a motor vehicle having at least one rear view device according to the invention.

The display device, the rear view device and the motor vehicle of the invention prove to be advantageous in many respects.

As the optical unit comprises an optical means having a plurality of optical elements which, depending on the distance from a coupling-in section of the light-conducting body, correspond or differ respectively, a light density of the light emitted from the optical unit can be adjusted.

As the coupling-out section of the light-conducting body comprises a plurality of coupling-out regions which are disposed in steps or in a sawtooth matter with respect to one another, the adjustment of the light density can be further improved.

BRIEF DESCRIPTION OF THE SEVERAL VIEWS OF THE DRAWINGS

Further features, details and advantages of the invention can be seen from the attached patent claims, from the graphical representations and the following description.

Preferred embodiments of the optical unit.

In the drawings:

FIG. 1 is a diagram illustrating a sectioned side view of a first exemplary embodiment of the optical unit of a display device according to the invention;

FIG. 2 is a diagram illustrating a detailed view of a region of the first exemplary embodiment of the optical unit according to FIG. 1;

FIG. 3 is a diagram illustrating a sectioned side view of a second exemplary embodiment of the optical unit of a display device according to the invention;

FIG. 4 is a diagram illustrating a schematic sectioned detailed view of an optical means according to the first exemplary embodiment.

DETAILED DESCRIPTION OF THE INVENTION

Figure 1:
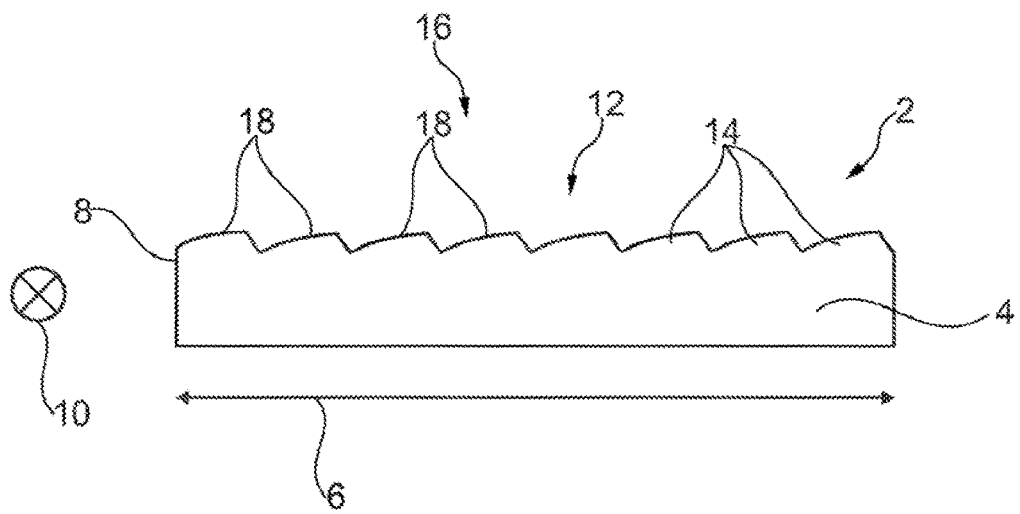

FIG. 1 shows a first exemplary embodiment of the optical unit, annotated as a whole with the reference 2, for a display unit according to the invention of a motor vehicle. The optical unit 2 comprises a light-conducting body 4 which extends along a main extension direction 6 in which it has its greatest extension. The light of a light source 10 of the display device can be coupled into the light-conducting body 4 by means of a coupling-in section 8. In addition, the light-conducting body 4 comprises a coupling-out section 12, through which the light can be coupled out of the light-conducting body 4. In the exemplary embodiments which can be seen in the figures, the coupling-out section 12 comprises a plurality of coupling-out regions 14 which are each disposed offset in a sawtooth manner with respect to one another.

In addition, the optical unit 2 comprises an optical means 16, which at least in some sections is secured to the light-conducting body 4 such that it is overlaid on the surface of the coupling-out section 12 of the light-conducting body 4. The optical means 16 comprises a plurality of optical elements 18, by means of which a beam path of the light passing through the optical element 18 can be deflected and/or split into light angles, in particular scattered. The plurality of optical elements 18 differs in its diffraction and/or reflection behavior depending on its distance from the coupling-in section 8 of the light-conducting body 4.

If the light-conducting body 4 and the optical means 16 comprise a common component, then the optical unit 2 is formed from an injection-molded part.

The plurality of optical elements 18 of the optical means 16 has a circular cross section and a dome-shaped contour. Here, the cross section of each optical element 18 increases with increasing distance from the coupling-in section 8. Not visible in the figures is, on each coupling-out region 14, a plurality of optical elements 18 which are disposed substantially parallel to one another, wherein in each case the optical elements 18 on a coupling-out region 14 are identical to one another with regard to their diffraction and/or reflection behavior and, in particular, have the same contour and the same cross section.

Figure 2:
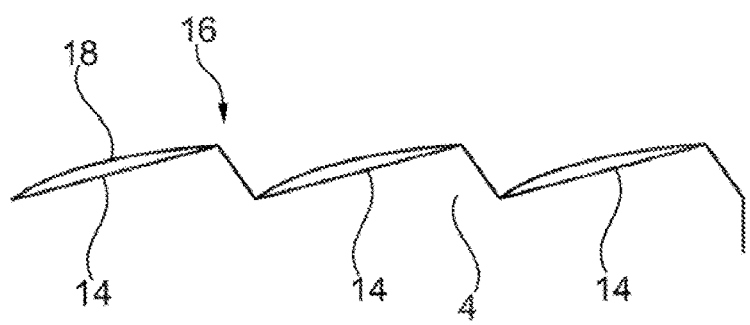

FIG. 2 shows a detailed view of a region of the first exemplary embodiment of the optical unit according to FIG. 1. Here, it can be seen that the individual coupling-out regions 14 of the coupling-out section 12 of the light-conducting body 4 are disposed offset in a sawtooth manner with respect to one another. Further, the circular-arc-shaped cross section of the optical elements 18 can be seen.

Figure 3:
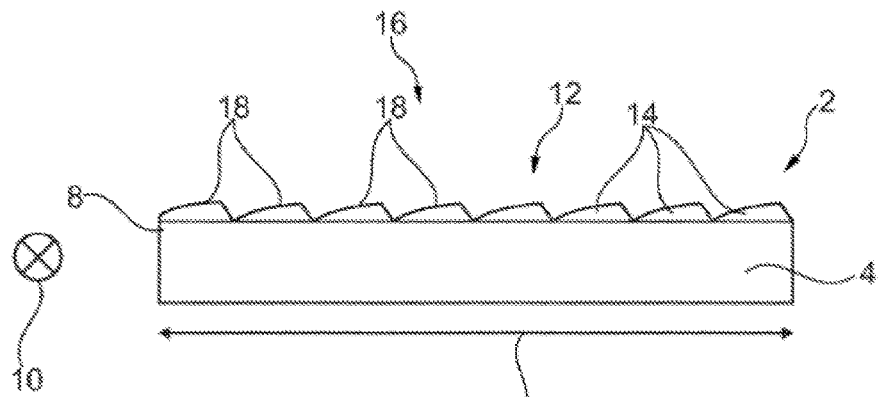

FIG. 3 shows a second exemplary embodiment of the optical unit 2. Identical parts are annotated with the same references. The exemplary embodiment according to FIG. 3 differs from the exemplary embodiment according to FIG. 1 in that the light-conducting body 4 and the optical means 18 are formed from two separate components. In such a case for example, the optical means 16 comprises an injection-molded part, a coating and/or a film.

Figure 4:
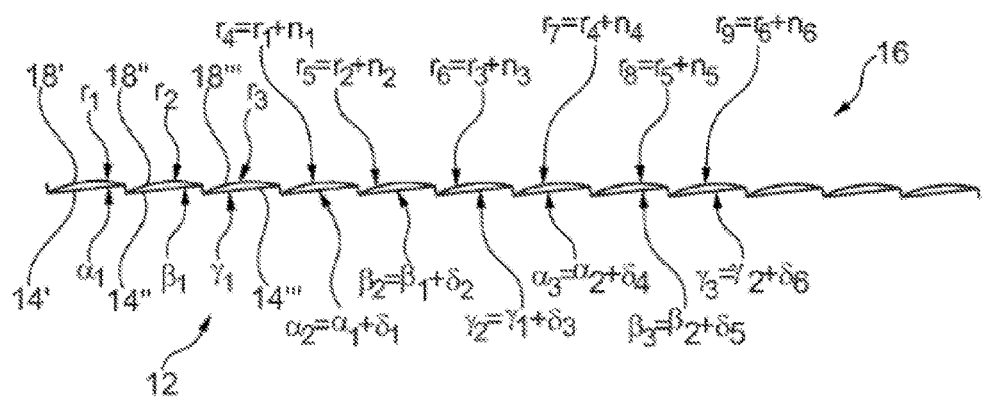

FIG. 4 is a schematic detailed view of the sawtooth design of the coupling-out regions 14 of the coupling-out section 12 and the change in cross section of the optical elements 18 of the optical means 16.

As can be seen in FIG. 4, a first coupling-out region 14' next to the coupling-in section 8 has a first angle of inclination $\alpha_1$ with respect to the main extension direction 6 of the light-conducting body 4. A second coupling-out region 14" adjacent to the first coupling-out region 14' on the side thereof which faces away from the coupling-in region 8 has a second angle of inclination $\beta_1$ with respect to the main extension direction 6 of the light-conducting body 4. A fourth coupling-out region 14''' adjacent to the second coupling-out region 14" on the side thereof which faces away from the coupling-in region 8 has a third angle of inclination $\gamma_1$ with respect to the main extension direction 6 of the light-conducting body 4.

In the schematic representations shown in FIG. 4, all further coupling-in regions 14" change as a function of the first angle of inclination $\alpha_1$, the second angle of inclination $\beta_1$ or the third angle of inclination $\gamma_1$ with the addition of an additional angle of inclination $\delta_1$ to $\delta_6$. Here, $\delta_1$ to $\delta_6$ can be equal or different in each case.

In addition, it can be seen from FIG. 4 that a first optical element 18' disposed on the first coupling-out region 14' has a radius $r_1$. A second optical element 18" disposed on the second coupling-out region 14" has a second radius $r_2$. A third optical element 18''' disposed on the third coupling-out region 14''' has a radius $r_3$.

All subsequent optical elements have a radius which is comprised of one of the radii $r_1$, $r_2$ or $r_3$ plus an additional radius $n_1$ to $n_6$. Here, $n_1$ to $n_6$ can correspond to or differ from one another.

The features of the invention shown in the above description, the claims and the drawings can be material for the realization of the invention in its different embodiments, both individually and in any combination.

LIST OF REFERENCES

2 Optical unit
4 Light-conducting body
6 Main extension direction
8 Coupling-in section
10 Light source
12 Coupling-out section
14 Coupling-out region
14' First coupling-out region
14" Second coupling-out region
14''' Third coupling-out region
16 Optical means
18 Optical element
18' First optical element
18" Second optical element
18''' Third optical element

The invention claimed is:

1. A display device for a motor vehicle configured to be disposed in a rear view device, such as an interior or exterior mirror, comprising:
   at least one light source;
   at least one optical unit comprising at least one light-conducting body which comprises:
      at least one coupling-in section through which light emitted by at the least one light source is configured to be coupled into the light-conducting body;
      at least one coupling-out section through which light is configured to be coupled out of the light-conducting body;
      at least one optical means which at least in some sections is configured to be secured to the light-conducting body such that it is overlaid on the surface of the at least one coupling-out section of the light-conducting body; and
      a plurality of optical elements through which a beam path of at least the light passing through the plurality of optical elements is configured to be at least one of deflected and split into light bundles which are scattered,
   wherein the at least one optical means provides a high luminance for different angled views of the display device by comprising the plurality of optical elements which, in response to being at a same distance from the coupling-in section of the light-conducting body, they correspond in their refraction or reflection behavior, and in response to being at a different distance from the coupling-in section of the light-conducting body, they differ in their refraction or reflection behavior, wherein the at least one coupling-out section of the light-conducting body comprises a plurality of coupling-out regions which are disposed offset in steps or in a sawtooth manner with respect to one another, wherein a first coupling-out region next to the coupling-in section has a first angle of inclination with respect to a main extension direction of the light-conducting body, wherein a second coupling-out region adjacent to the first coupling-out region and facing away from the coupling-in region has a second angle of inclination with respect to the main extension direction, wherein a third coupling-out region adjacent to the second coupling-out region and facing away from the coupling-in region has a third angle of inclination with respect to the main extension direction, wherein an (n+1)th coupling-out region adjacent to an (n)th coupling-out region and facing away from the coupling-in region has an (n+1)th angle of inclination with respect to the main extension direction, and wherein each (n+1)th angle of inclination is an addition of the first angle of inclination, the second angle of inclination, or the third angle of inclination with at least one additional angle of inclination from a group of different additional angles of inclination.

2. The display device of claim 1, wherein each of the plurality of optical elements has an n-cornered, arrow-shaped, curved, or circular-arc-shaped cross section or a pyramid, dome-shaped, or elliptical contour.

3. The display device of claim 1, wherein the cross section of each of the plurality of optical elements increases or decreases with increasing distance from the coupling-in section.

4. The display device of claim 1, wherein the plurality of optical elements have the same diffraction or reflection behavior or the same cross section and are disposed on each coupling-out region.

5. The display device of claim 1, wherein the light conductor has its greatest extension along a main extension direction and that, when they are at the same distance or at a different distance from the coupling-in section of the light-conducting body, the coupling-out regions have the same or a different inclination respectively with regard to the main extension direction.

6. The display device of claim 1, wherein the inclination of the coupling-out regions with respect to the main extension direction increases with increasing distance or that the cross sections of the plurality of optical elements increase with increasing distance from the coupling-in section.

7. The display device of claim 1, wherein the at least one coupling-in section is disposed running substantially perpendicular to the main extension direction of the light-conducting body.

8. The display device of claim 1, wherein the light-conducting body and the optical means comprise a common component that is an injection-molded part, or two separate or separable components where the light-conducting body comprises an injection-molded part and the optical means comprises an injection-molded part, a coating, or a film.

9. The display device of claim 1,
wherein the optical element has a circular-arc-shaped cross section that is a dome,
wherein a plurality of first optical elements disposed on a first coupling-out region have a first radius,
wherein a plurality of second optical elements disposed on a second coupling-out region have a second radius,
wherein a plurality of third optical elements disposed on a third coupling-out region have a third radius, or
wherein a plurality of (n)th optical elements disposed on an (n)th coupling-out region have an (n)th radius.

10. A rear view device in the form of an interior or exterior mirror having at least one display device according to claim 1.

11. A motor vehicle having at least one rear view device according to claim 10.

* * * * *